US010592520B2

(12) United States Patent
Klaus et al.

(10) Patent No.: US 10,592,520 B2
(45) Date of Patent: Mar. 17, 2020

(54) VISUALIZATION OF SOCIAL NETWORK METRICS

(71) Applicant: Oracle International Corporation, Redwood Shores, CA (US)

(72) Inventors: Kenneth F. Klaus, Dublin, CA (US); Mary E. G. Bear, Burlingame, CA (US); Chau Ha Leung, Castro Valley, CA (US); Michael Lin, San Francisco, CA (US); Kristine Lois Van der Ploeg, Fremont, CA (US); Kathi Lynn Chenoweth, Schererville, IN (US)

(73) Assignee: Oracle International Corporation, Redwood Shores, CA (US)

( * ) Notice: Subject to any disclaimer, the term of this patent is extended or adjusted under 35 U.S.C. 154(b) by 683 days.

(21) Appl. No.: 14/948,140

(22) Filed: Nov. 20, 2015

(65) Prior Publication Data

US 2016/0078108 A1    Mar. 17, 2016

Related U.S. Application Data

(63) Continuation of application No. 13/593,408, filed on Aug. 23, 2012, now Pat. No. 9,224,130.

(51) Int. Cl.
*G06F 16/248* (2019.01)
*G06F 16/2457* (2019.01)
(Continued)

(52) U.S. Cl.
CPC ........ *G06F 16/248* (2019.01); *G06F 3/04812* (2013.01); *G06F 16/24578* (2019.01);
(Continued)

(58) Field of Classification Search
CPC ............................ G06Q 30/0251; G06F 16/248
See application file for complete search history.

(56) References Cited

U.S. PATENT DOCUMENTS 7,752,017 B1    7/2010 Leary et al.
7,991,632 B1    8/2011 Morris et al.
(Continued)

FOREIGN PATENT DOCUMENTS

EP      540442 A2    5/1993
GB     2479647 A    10/2011
(Continued)

OTHER PUBLICATIONS

NetSuite Open Air—obtained at www.openair.com; Apr. 3, 2012; 1 page.

(Continued)

*Primary Examiner* — William L Bashore
*Assistant Examiner* — Nathan K Shrewsbury
(74) *Attorney, Agent, or Firm* — Trellis IP Law Group, PC (57) ABSTRACT

Embodiments describe a system and method for presenting a data visualization using, at least in part, social network metrics. The social network metrics can include components such as a social connection score, a social content score and a social conversation score. Further details and values of the metrics can include a number of social network connections that an individual has in their social network, a number of content followers of the individual, a number of social network spaces to which the individual belongs, an indication of how a human resource interacts with others within a social network, a number of bookmarks shared, a number of tags added to particular areas of interest, a number of tags added to certain areas of expertise, and others.

20 Claims, 7 Drawing Sheets

(51) Int. Cl.
*G06F 3/0481* (2013.01)
*G06Q 10/10* (2012.01)
*G06Q 50/00* (2012.01)
*G06Q 30/02* (2012.01)

(52) U.S. Cl.
CPC ....... *G06Q 10/105* (2013.01); *G06Q 30/0251* (2013.01); *G06Q 50/01* (2013.01); *G06F 2203/04803* (2013.01)

(56) References Cited

U.S. PATENT DOCUMENTS

| | | | |
|---|---|---|---|
| 8,229,777 B2 | 7/2012 | Sciuk | |
| 8,312,056 B1* | 11/2012 | Peng | G06Q 50/01 705/319 |
| 9,235,865 B1* | 1/2016 | Zang | H04W 4/21 |
| 9,684,868 B2* | 6/2017 | Lawrence | G06Q 10/10 |
| 2003/0236692 A1 | 12/2003 | Hertel-Szabadi | |
| 2005/0004825 A1 | 1/2005 | Ehrler et al. | |
| 2005/0086211 A1 | 4/2005 | Mayer | |
| 2005/0187956 A1* | 8/2005 | Sylvester | G06Q 10/10 |
| 2006/0015388 A1 | 1/2006 | Flockhart et al. | |
| 2006/0042483 A1* | 3/2006 | Work | G06Q 10/00 101/91 |
| 2006/0095420 A1 | 5/2006 | Ikegami et al. | |
| 2007/0271260 A1 | 11/2007 | Valentino | |
| 2008/0268951 A1 | 10/2008 | Gross | |
| 2009/0144075 A1 | 6/2009 | Flinn et al. | |
| 2010/0119053 A1* | 5/2010 | Goeldi | G06Q 10/00 379/265.09 |
| 2010/0153282 A1 | 6/2010 | Graham | |
| 2011/0087985 A1 | 4/2011 | Buchanan | |
| 2011/0250939 A1 | 10/2011 | Hobler | |
| 2011/0288939 A1* | 11/2011 | Elvekrog | G06Q 30/0269 705/14.67 |
| 2012/0109737 A1* | 5/2012 | Setty | G06Q 30/0242 705/14.41 |
| 2012/0166530 A1* | 6/2012 | Tseng | G06Q 30/0255 709/204 |
| 2012/0209918 A1* | 8/2012 | Shah | G06Q 30/0251 709/205 |
| 2012/0226748 A1* | 9/2012 | Bosworth | G06Q 10/103 709/204 |
| 2012/0296967 A1* | 11/2012 | Tao | G06Q 30/0251 709/204 |
| 2013/0085844 A1* | 4/2013 | Neystadt | G06Q 30/02 705/14.49 |
| 2013/0212479 A1* | 8/2013 | Willis | G06Q 10/10 715/736 |
| 2013/0290448 A1 | 10/2013 | Work | |
| 2013/0346330 A1 | 12/2013 | Fleischman et al. | |
| 2014/0089400 A1* | 3/2014 | Yan | H04L 67/306 709/204 |
| 2014/0164398 A1* | 6/2014 | Smith | G06F 16/24578 707/748 |
| 2015/0073776 A1* | 3/2015 | Banatwala | G06F 17/274 704/9 |

FOREIGN PATENT DOCUMENTS

| | | |
|---|---|---|
| JP | 2003044642 A | 2/2003 |
| JP | 2005157630 A | 6/2005 |

OTHER PUBLICATIONS

Professional Services Automation Software for Projector PSA—obtained at www.projectorPSA.com; Apr. 3, 2012; 1 page.
Author Unknown, "Resource Allocation from the Top & Bottom—You Need Both!" ManagePro, accessed Jan. 12, 2012 from http://www.managepro.com/resourceallocation.html, Copyright 1998-2011, Performance Solutions Technology, LLC; 7 pages.

* cited by examiner

VISUALIZATION OF SOCIAL NETWORK METRICS

CROSS REFERENCES TO RELATED APPLICATIONS

This application is a continuation of U.S. patent application Ser. No. 13/593,408, entitled TALENT PROFILE INFOGRAPHIC, filed on Aug. 23, 2012 and related to the following applications, U.S. patent application Ser. No. 13/438,372, entitled CARD VIEW FOR PROJECT RESOURCE SEARCH RESULTS, filed on Apr. 3, 2012 and Ser. No. 13/458,858, entitled PROJECT RESOURCE QUALIFICATION AND KEYWORD SCORING, filed on Apr. 27, 2012, which are hereby incorporated by reference, as if set forth in full in this specification:

BACKGROUND

The present application relates to software and more specifically to systems, user interfaces, and methods for accessing, organizing, and presenting enterprise data.

Systems and methods for accessing and displaying enterprise data are employed in various demanding applications, including Business Intelligence (BI), Incentive Compensation (IC), Customer Relationship Management (CRM), talent management, and other Enterprise Resource Planning (ERP) systems.

Effective systems and methods for accessing and presenting enterprise data are particularly important in enterprise talent management applications, where awareness of employee performance, improvement, skill levels, and so on, may facilitate ascertaining adjustments needed to maximize employee talent and productivity and to ensure that current and future business objectives are met.

Conventionally, employee performance is often periodically tracked, e.g., bi-annually or annually, via performance reports generated by a manager or Human Resource (HR) specialist. Such reports often comprise a static view of talent ratings or other talent management data. The talent management data in such reports may reflect employee ratings and data at a particular time.

The reports may lack functionality for providing more in depth insights into an employee's performance, skill, and so on. Furthermore, such reports may be cumbersome, and may require that a manager scroll through volumes of data to find particular data of interest. The cumbersome reports may be particularly difficult to view via mobile devices, which are becoming increasingly widespread in enterprise environments.

SUMMARY

An example method facilitates selectively displaying enterprise data via a user interface display. The example method includes providing a first user option to select enterprise data to be displayed, yielding selected data in response thereto. The data to be displayed includes data pertaining to a human resource, such as an enterprise employee or contractor. The example method further includes employing a capsule to present a visualization or infographic characterizing at least a portion of the selected data, and providing a second user option to flip or rotate the capsule, thereby displaying additional enterprise data that is related to or representative of the selected data or portion thereof.

In a more specific embodiment, the first user option includes a slider bar that enables a user to specify a time frame to filter the enterprise data. Another user option enables a user to add one or more capsules to a user interface display. Each of the one or more capsules may present a different set of data pertaining to the human resource.

In the specific embodiment, the visualization or infographic includes a graph depicting the selected data for the specified time interval. The selected data may include, for example, one or more indications of salary, talent scores, performance ratings, social network metrics, and so on. Social network metrics may include an indication of a level of collaboration between the human resource and other human resources in the social network of the human resource. Example social network metrics include a measurement of content created by the human resource within the specified time interval; an indication of a percentage of times that the human resource responds to content created by other human resources in the enterprise social network of the human resource within the specified time interval; an indication of a number of social network connections characterizing the social network of the human resource, and so on. The selected data may further include overall scores, which may include averages or combinations of one or more other scores associated with the human resource.

The example method further includes providing a third user option to compare selected data associated with the human resource with corresponding data pertaining to a group of human resources within an organization. The third user option further include a user option to simultaneously illustrate the selected data and the corresponding data via a visualization or infographic.

A fourth user option enables a user to select a feature of the visualization to trigger flipping the capsule, which contains the visualization or infographic. The feature used to trigger flipping of the capsule may include, for example, a data point depicted on a graph. An additional user option enables a user to select the group of human resources for comparison purposes. The group may be a team, department within an enterprise, all employees of the enterprise, and so on.

Hence, certain embodiments discussed herein may provide interactive capsules and accompanying infographics that facilitate aggregating, summarizing, and comparing key talent ratings and social metrics for individuals, teams, organizations. Additional option for flipping capsules to reveal additional information, i.e., to drill further into data represented via an infographic may further facilitate efficiently conveying information. Furthermore, use of infographics as discussed herein may facilitate concisely conveying information in a relatively confined screen area, which can be particularly advantageous for mobile applications.

In addition, included mechanisms for presenting historical data pertaining to performance scores, talent ratings, social network metrics, and so on, may facilitate concisely conveying growth or trend information. Furthermore, use of social network metrics for characterizing a human resource's collaboration or participation within an enterprise may provide heretofore inaccessible insights into employee contributions and performance and may further encourage participation in enterprise activities.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while the present application is discussed with respect to systems and methods for facilitating access to and manipulation of enterprise data to facilitate informed decision making, embodiments are not limited thereto. For example, any computing environment, such as those employed in universities, governments, and so on, may benefit from use of various embodiments disclosed herein.

Furthermore, while certain embodiments discussed herein involve selectively presenting information, such as talent, performance, and social network ratings, embodiments are not limited thereto. Other types of data characterizing an entity other than a human resource may be graphically depicted and presented via capsules, as discussed herein, to facilitate comparing, visualizing, and/or adjusting displayed data (e.g., by drilling down) in accordance with embodiments discussed herein.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Enterprise Resource Planning (ERP) software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components. An ERP system may be any infrastructure, i.e., resources, such as hardware and ERP software, used to facilitate managing resources of an organization.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

A visualization may be any graphical presentation of data resulting from an information visualization technique. Information visualization may be any process involving graphically representing data according to a method or scheme. Example visualizations include pie charts, treemaps, bar charts, graphs, and so on. The terms "infographic" and "visualization" may be employed interchangeably herein.

Various talent profile infographics discussed herein may provide informative interactive visual representations of data that might otherwise exist in one or more static pages within the software solution or profile reports, wherein the visualizations are further adapted to enable triggering comparisons across teams, departments, organizations, and so on, as discussed more fully below.

For clarity, certain well-known components, such as hard drives, processors, operating systems, power supplies, and so on, have been omitted from the figures. However, those skilled in the art with access to the present teachings will know which components to implement and how to implement them to meet the needs of a given implementation.

Figure 1:
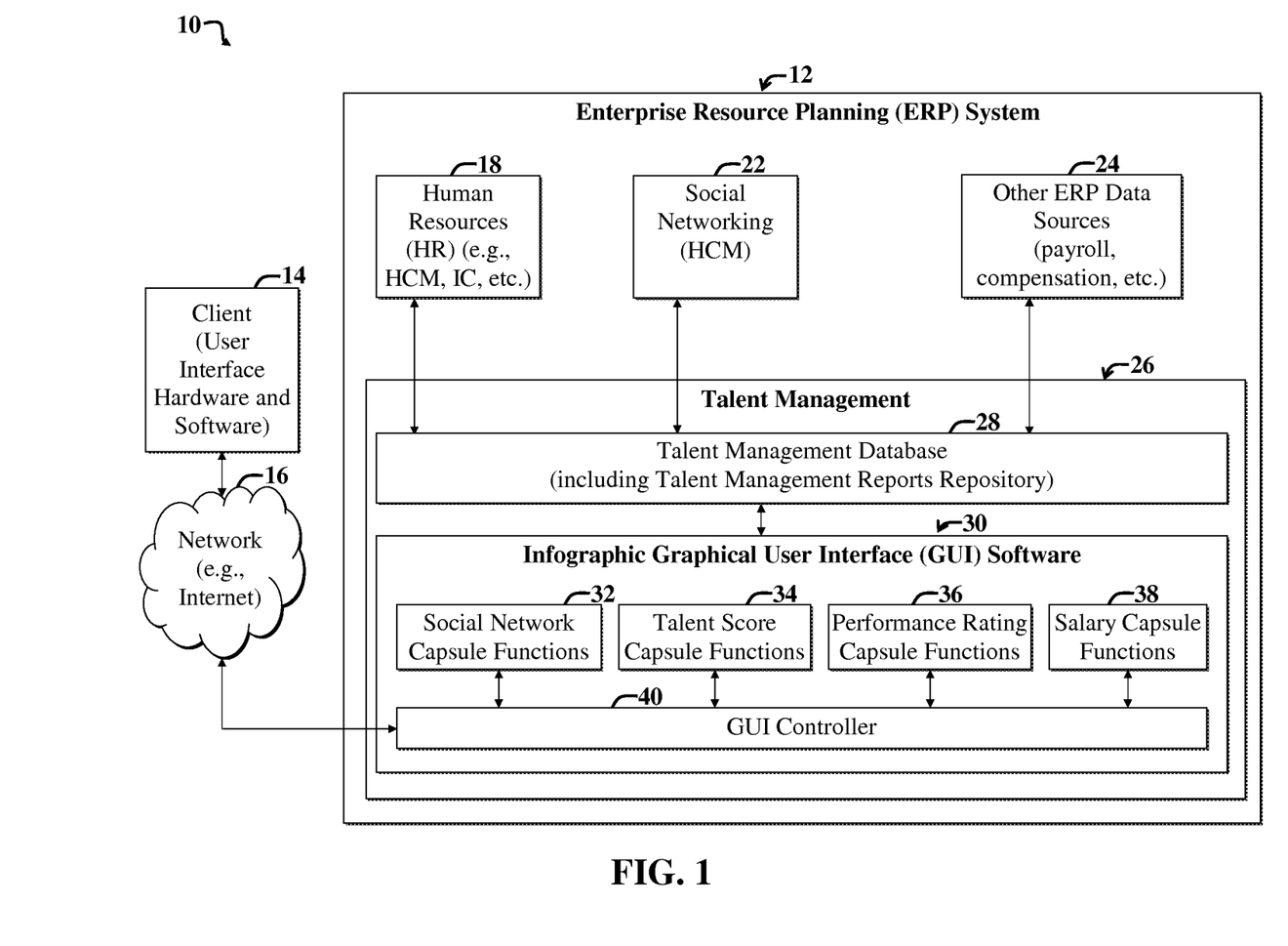
FIG. 1 is a diagram illustrating an example embodiment of an enterprise system incorporating infographic software.

FIG. 1 is a diagram illustrating an example embodiment of an enterprise computing environment 10 incorporating infographic software 30 as part of an ERP system 12. The enterprise computing environment 10 further includes a client computer system 14 in communication with the ERP system 12 via a network 16, such as the Internet. The client 14 may include mobile device, such as a smart phone, tablet, or laptop, and so on. The client 14 may include a browser and/or other software for accessing the ERP system 12 via the client 14. Note that while the client 14 and accompanying user interface communicates with the ERP system 12 via a network 16, the client 14 or other user interface display mechanism may be coupled directly to the ERP system 12, without departing from the scope of the present teachings.

The example ERP system 12 includes an HR application 18, a social networking application 22, and may further include other ERP applications and data sources 24, such as a Business Intelligence (BI) application. Talent management software 26 communicates with the various ERP applications 18, 22, 24 and may mine, i.e., collect data therefrom.

The talent management software 26 further includes a talent management database 28, which may act as a repository for enterprise data employed by a infographic Graphical User Interface (GUI) software module 30, also called the infographic module 30. The infographic module 30 includes various functional blocks 32-38, which communicate with the talent management database and a GUI controller 40. The GUI controller 40 may include computer code for facilitating rendering various user interface display screens on the client 14.

The example functional blocks 32-38 include a social network module 32, a talent score module 34, a performance rating module 36, and a salary module 38. The modules 32-38 include computer code for facilitating implementing various capsules and associated functions, as discussed more fully below.

Note that while various components of the ERP system 12 are represented by separate modules, various modules may be integrated or combined into one or more modules without departing from the scope of the present teachings. Furthermore, the ERP system 12 may be implemented on a single computer system or may be distributed among computing resources of a network.

In an example operative scenario, a user employs the client 14 and accompanying user interface to access the infographic software 30. The infographic controller 40 includes computer code for facilitating rendering various user interface display screens that include various capsules. The capsules may include visualizations or infographics that may enable a user to selectively graphically depict enterprise data associated with one or more human resources or groups thereof, as discussed more fully below.

For the purposes of the present discussion, a human resource may be any person and accompanying knowledge and capabilities that may provide value to an organization, such as in the form of work or other effort. Examples of human resources include enterprise personnel, i.e., persons associated with an enterprise, such as employees, independent contractors, managers, investors, and so on.

A capsule may be any mechanism, such as a window, for displaying data in a region of a user interface display screen, wherein one or more user interface controls are provided for changing or refreshing data displayed in the region, such as by flipping, rotating, peeling layers, and so on. A capsule, also called a panel herein, is said to be flipped, rotated, or peeled, if information or features displayed in a region defined by a capsule border is updated, changed, or replaced.

Examples of enterprise data presentable via capsules and accompanying infographics discussed herein include social network data (e.g., social network connection metrics, conversation metrics, and content metrics), talent score data, performance ratings, salary information, and so on. The various capsules and accompanying infographics are further adapted to enable users, such as managers or HR specialists, to selectively initiate comparisons of data; to drill down into further data detail underlying graphically depicted data; to view overall scores, score averages, score summaries, and so on; to view historical data, e.g., histories of various ratings and scores, and so on.

The various component modules 32-38 include computer code for selectively retrieving data from the talent management database 28, which may selectively retrieve any needed data from other ERP modules 18, 22, 24 to illustrate data in accordance with user interface code running on the GUI controller 40 and in response to various user inputs, as discussed more fully below.

Figure 2:
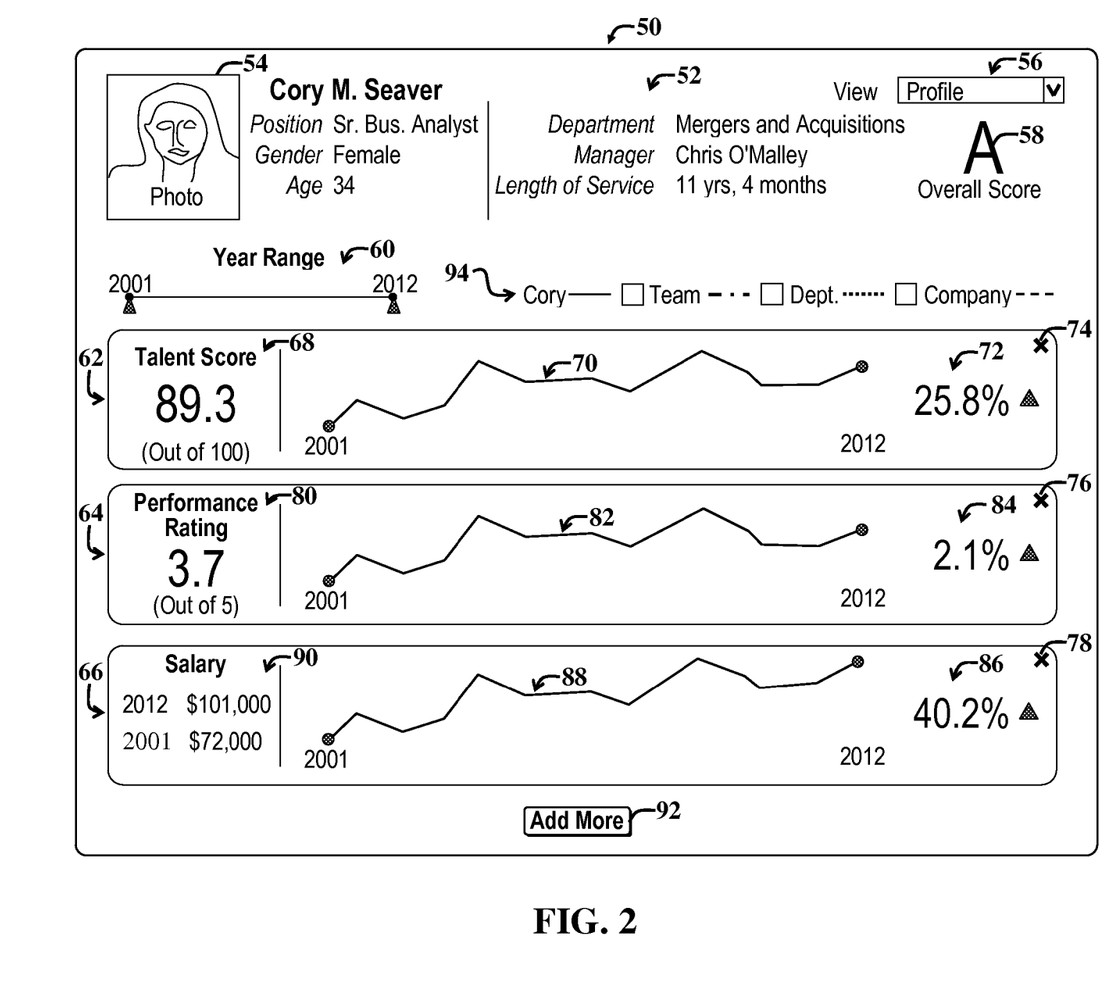
FIG. 2 is a diagram illustrating a first example user interface display screen, which may be generated by the system of FIG. 1 and includes various example infographic capsules.

FIG. 2 is a diagram illustrating a first example user interface display screen 50, which may be generated by the system 10 of FIG. 1 and which includes various example infographic capsules 62-66.

The example user interface display screen 50 includes a header section 52, which contains information about the human resource for which enterprise data is displayed. Example information in the header section 52 includes a name and photograph 54, position title, gender, age, department, manager, length of service or employment, and an overall score 58. The overall score 58 may represent a combination of various scores, such as a talent score 68, a performance rating 80, and so on. Exact details as to how the overall score 58 is calculated and which scores, ratings, metrics, or parameters are used to calculate the score are implementation specific and may vary.

For the purposes of the present discussion, an overall score may be any number or metric that incorporates, in a calculation of the metric, plural metrics (e.g., talent score, performance rating score, and social network score) describing or characterizing a person or other resource. A score, rating, or metric may be a number that represents a measurement of a quality or characteristic of a human resource.

The header section 52 further includes a view drop down menu 56, which provides user options for selecting categories of data to be displayed via capsules. In the present example embodiment, a profile view has been selected. Accordingly, enterprise data presented via the display screen 50 represents information related to a human resource profile, such as Cory M. Seaver's talent scores, performance ratings, and so on. Note that additional information other than a particular human resource's profile information may be illustrated, such as averages of profile information of other groups of human resources. Such additional information may be employed for illustrating comparison, as discussed more fully below.

The header section 52 further includes user interface controls 60, 94, which provide user options for adjusting data date ranges and for selecting groups of human resources for comparison purposes, respectively. In particular a time slider bar control 60 includes movable slider bars, which may be positioned to establish a date range for filtering, highlighting, or otherwise adjusting displayed enterprise data in accordance with times applicable to the enterprise data. A set of check boxes 94 include user selectable entities or groups, such as a team, department, or company. A user may select one of the check boxes 94 to effectuate a comparison operation, as discussed more fully below.

For the purposes of the present discussion, a comparison may be any juxtaposition of data to be compared. A comparison operation may be any operation or function that acts to juxtapose data to be compared. A juxtaposition may include any simultaneous presentation of or illustration of data to be compared. A juxtaposition may also include a combination of data to be displayed, where the combination shows or illustrates a difference or contrast between the data to be compared.

The various capsules 62-66 are positioned below the header section 52. The example capsules 62-66 include a talent score capsule 62, a performance rating capsule 64, and a salary capsule 66. Note that additional capsules may be added to the display screen 50 by selecting an add-more button 92. Selection of the add-more button 92 may trigger display of another user interface display screen or window, whereby a user may select capsules from among a list of available capsules. Various capsules 62-66 may be selectively removed from the display screen 50 via user selection of close controls 74-78 included in the upper right portion of each capsule 62-66.

The talent score capsule 62 includes a numerical talent score section 68 positioned at a far left side of the capsule 62. The numerical talent score section 68 indicates a current numerical value (e.g., 89.3) for the talent score associated with the human resource (Cory M. Seaver) indicated in the header section 52. A visualization, such as a graph 70, is positioned adjacent to the numerical talent score section 68. The graph 70 depicts historical data that illustrates how Cory M. Seaver's talent score has changed over a time interval specified via the time slider bar control 60. The historical graph 70 is adapted to enable a user to position a mouse cursor over various portions of the graph 70 to illustrate, e.g., via a hover layer, data underlying the graph at the position of the mouse cursor. Illustrating data underlying a visualization, such as a graph, is referred to as drilling down.

Each of the various capsules 62-66 may be rotated or flipped to reveal additional underlying data via a subsequently displayed facet of each capsule 62-66. Graphs 70, 82, 88 are adapted to enable a user to flip the capsules 62-66 via user selection of one or more data points thereof, e.g., via a mouse cursor. For example, depending upon the implementation, a user may double click or single click a data point of the graph 70 to flip the talent score capsule to provide a different or more detailed illustration of the talent score data provided in the talent score capsule 62. The different or more detailed illustration may include numerical data, which may be presented via a table, list, or via another mechanism.

A talent score percentage change section 72 is positioned adjacent to the graph 70. The percentage change section 72 indicates a percentage change in Cory M. Seaver's talent score over the time interval specified via the time slider bar control 60. Note that various numerical values listed, e.g., in the numerical talent score section 68 and the percentage change section 72, may be illustrated graphically, such as via a bar graph, without departing from the scope of the present teachings.

The performance rating capsule 64 includes a numerical performance rating section 80, a performance rating graph 82, and a performance rating percentage change section 84. The construction and operation of the performance rating capsule 64 is similar to the construction and operation of the talent score capsule 62, with the exception that the performance rating capsule 64 displays performance rating information instead of talent score information.

The salary capsule 66 includes a numerical salary section 90, a salary graph 88, and a salary percentage change section 86. The construction and operation of the salary capsule 66 is similar to the construction and operation of the talent score capsule 62 and the performance rating capsule 64 with the exception that the salary capsule 66 displays salary information and with the exception that the numerical salary section 90 indicates beginning and current salary levels as opposed to just the most current levels. Note that the numerical sections 68, 80 of the talent score capsule 62 and the performance rating capsule 64 may alternatively illustrate beginning and current data (not just current data), without departing from the scope of the present teachings.

Figure 3:
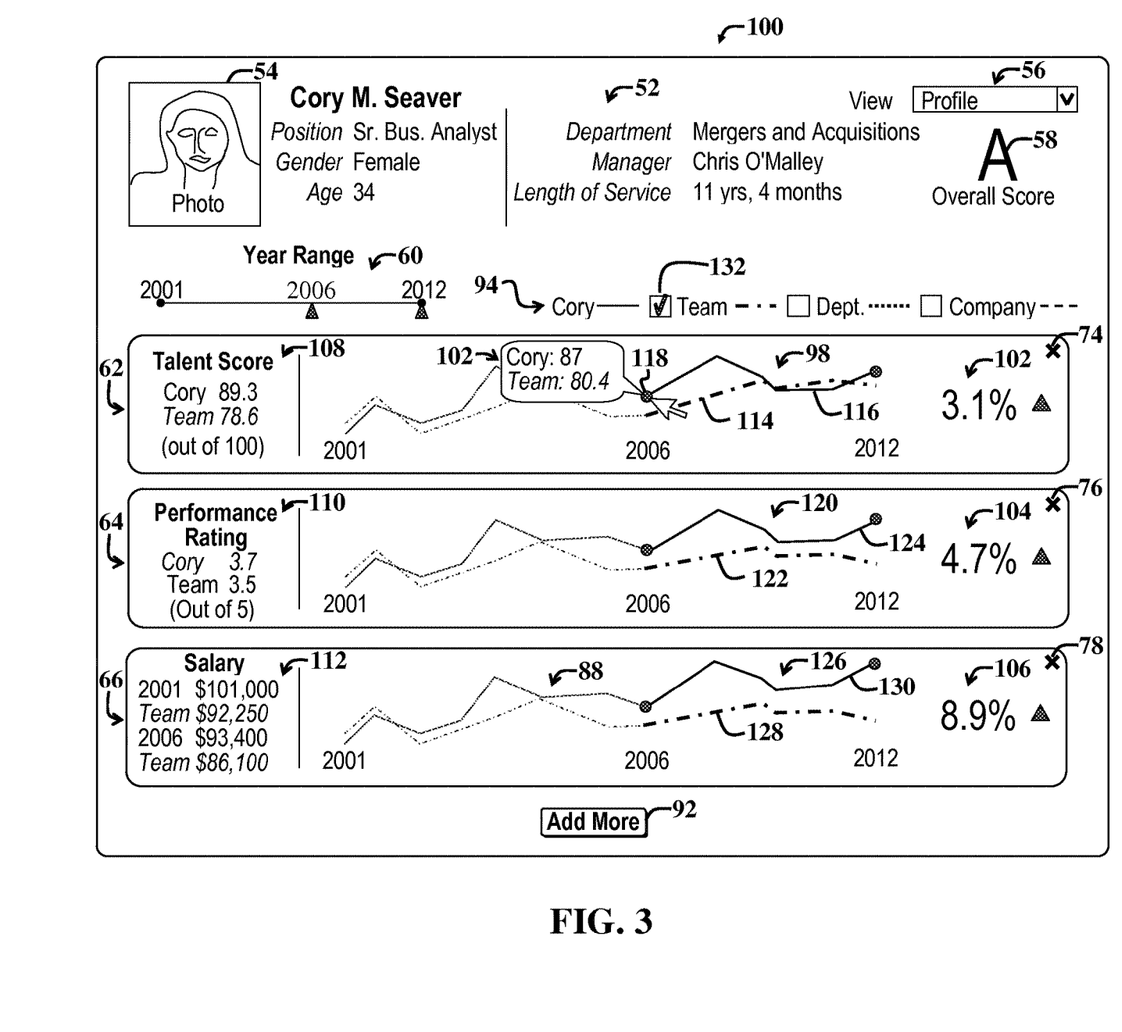
FIG. 3 is a diagram illustrating a second example user interface display screen, which illustrates the capsules of FIG. 2 after a time slider adjustment and selection of a comparison option.

FIG. 3 is a diagram illustrating a second example user interface display screen 100, which illustrates the capsules 62-66 of FIG. 2 after the time slider bar control 60 has been adjusted and after selection of a team comparison option 132 from among the check boxes 94 of the header section 52.

Selection of the team comparison option 132 triggers a comparison between enterprise data associated with Cory M. Seaver and averages of corresponding enterprise data for a particular team to which Cory M. Seaver belongs. For example, the talent score capsule 62 includes an updated numerical talent score section 108, which indicates average numerical values for the talent scores of Cory M. Seaver and average scores for Cory M. Seaver's team over the time interval (e.g., between 2006 and 2012) specified by the time slider bar control 60. Note that in certain cases, both sliders of the time slider bar control 60 may be positioned at the same point, e.g., 2012. For example, assuming that 2012 (as indicated in the time slider bar control 60) represents the current date, then if both sliders of the time slider bar control 60 were positioned at 2012, then selection of the team comparison option 132 would trigger a comparison between current enterprise data associated with Cory M. Seaver and current averages of corresponding enterprise data for a particular team to which Cory M. Seaver belongs. An updated talent score capsule 62 would include an updated numerical talent score section 108, which would indicate current numerical values for the talent scores of Cory M. Seaver and current average scores for Cory M. Seaver's team.

Note that while in the present example embodiment, the scores provided in the numerical talent score section 108 represent average scores over an interval represented by sliders of the time slider bar control 60, that such scores need not be average scores over the specified interval. For example, the scores provided in the numerical talent score section 108 may represent scores for the time corresponding to the position of a rightmost slider of the time slider bar control 60. The sliders of the time slider bar control 60 may be adjusted, such as by employing a computer mouse to click and drag the sliders.

The talent score capsule 62 further includes an updated talent score graph 98. The updated talent score graph 98 includes a first plot 116, which corresponds to the graph 70 of FIG. 2. However, the first plot 116 has been updated such that a portion of the first plot 116 corresponding to talent scores prior to 2006 has been lightened, and a portion of the first plot 116 between 2006 and 2012 has been highlighted or darkened. Note that time interval corresponding to the highlighted portion of the first plot 116 corresponds to the time interval selected via the time slider bar control 60.

The updated talent score graph 98 further includes a second plot 114 which illustrates average talent scores for the team corresponding to the selected team option 132 over a similar time interval as the first plot 116. The second plot 114 also includes a highlighted portion between the selected time interval (2006-2012). By simultaneously illustrating historical average team talent scores via the second plot 116 and corresponding historical talent scores for Cory M. Seaver, a user, such as an HR specialist or manager can readily visually compare Cory M. Seaver's talent score data with that of the team. The updated talent score graph 98 is said to represent a comparison between Cory M. Seaver and the selected team.

Note that if a user has selected another option or additional options, such as a department and/or company from among the check boxes 132, historical average talent score data corresponding to the selected options would be plotted in addition to or instead of historical talent score data for the selected team. For example, additional selection of the company check box from among the check boxes 94 would result in a third plot being illustrated in the capsules 62-66.

The first capsule 62 further illustrates a hover layer 102 appearing over a data point 118 of the updated talent score graph 98. The example hover layer 102 may appear in response to a user positioning a mouse over the data point 118. Note that other user input mechanisms other than computer mice may be employed to trigger display of a hover layer or to otherwise provide user input to control a user interface display screen. For example, user input mechanisms for detecting hand gestures, touch screen inputs, voice inputs, and so on may be employed in addition to or instead of computer mice, keyboards, or other standard input mechanisms. Data illustrated in the hover layer 102 represents data of the first plot 116 and the second plot 114 underlying the data point 118 and corresponding point (directly in line with the data point 118) on the second plot 114.

Note that other hover layers (other than the hover layer 102 shown) may appear as a user moves a mouse cursor over different portions of the graph 98. The hover layer 102 is said to be displayed on mouse-over of the data point 118. If a user instead employs a mouse to click or double click the data point 118, this may trigger flipping or rotating of the capsule 62 to reveal a listing of numerical values underlying the graph 98 or to reveal different or additional talent score data and/or visualization(s).

The first capsule 62 further includes an updated percentage change section 102. The updated percentage change section 102 illustrates a numerical value representative of a percentage change in Cory M. Seaver's talent score over the time interval selected via the time slider bar control 60.

The second capsule 64 has been updated similarly to the first capsule 62. The second capsule 64 includes an updated performance rating section 110, an updated performance rating graph 120, and an updated performance rating percentage section 104.

In addition, the third capsule 66 has been updated similarly to the first capsule 62 and the second capsule 64. The third capsule 66 includes an updated salary section 112, and updated salary graph 126, and an updated percentage change section 106.

Note that while the various updated graphs 98, 120, 126 show a highlighted portion and a non-highlighted portion, embodiments are not limited thereto. For example, the non-highlighted portions of the graphs 98, 120, 126 may be omitted from the updated graphs 98, 120, 126, without departing from the scope of the present teachings.

Figure 4:
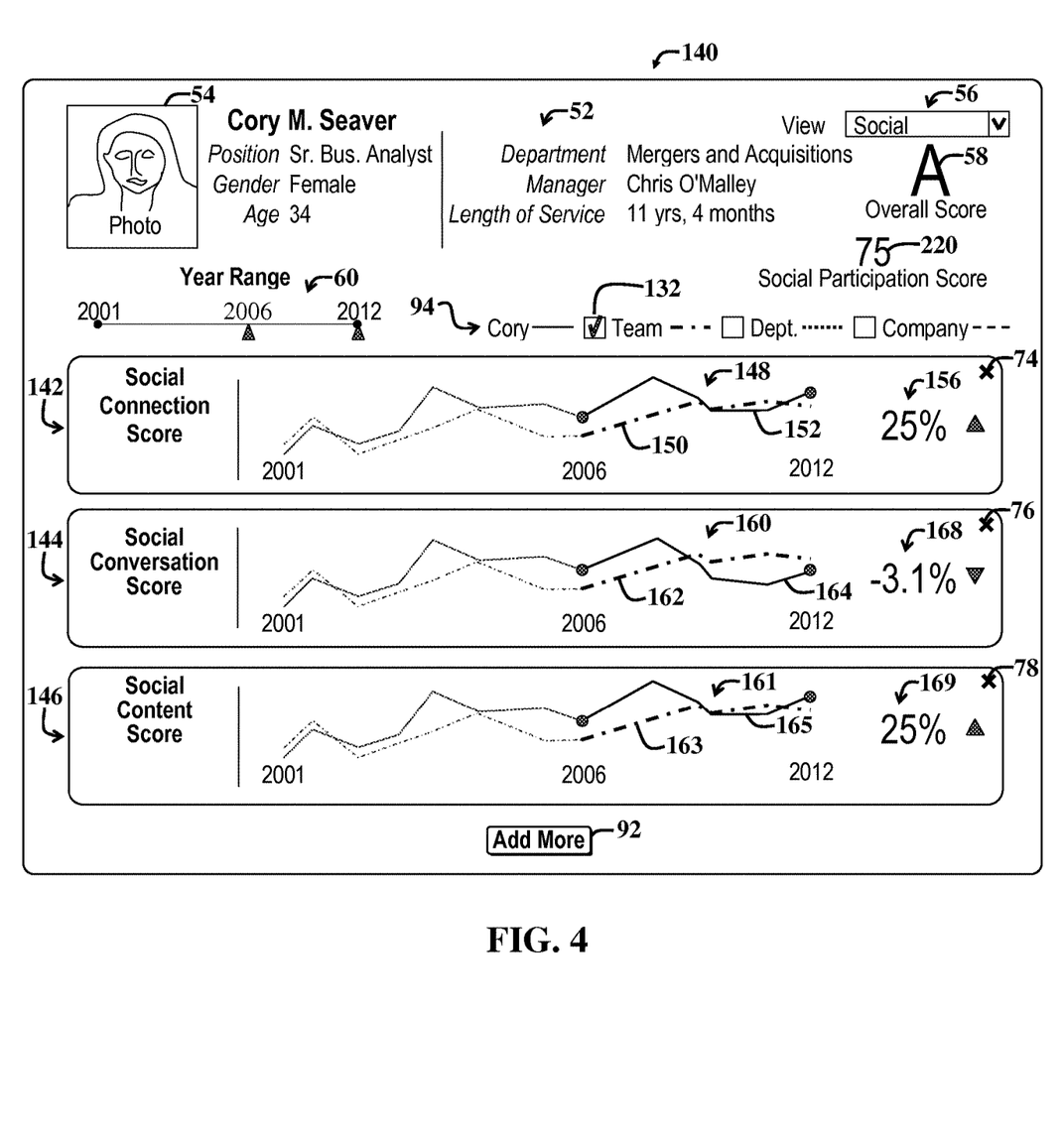
FIG. 4 is a diagram illustrating a third example user interface display screen, which illustrates various example social network capsules and accompanying infographics.

FIG. 4 is a diagram illustrating a third example user interface display screen 140, which illustrates various example social network capsules 142-146 and accompanying infographics 148, 160, 171. The user interface display screen 140 is similar to the user interface display screens of FIG. 3 with the exception that capsules 62-66 of FIG. 3 have been closed (e.g., via the close controls 74-78), and the social network capsules 142-146 have been added (e.g., via selection of the add-more button 92). Alternatively, the capsules 62-63 of FIG. 3 may be automatically replaced with the capsules 142-146 of FIG. 4 in response to selection of "Social" from the view drop down menu 56.

The social network capsules 142-144 include a social connection score capsule 142, a social conversation score capsule 144, and a social content score capsule 146, which provide data pertaining to a social connection score, social conversation score, and social content score, respectively. These three scores may be combined as components of an overall social participation score. Each component of a social participation score may be selectively weighted, averaged, configured, and combined to meet the needs of a given implementation. Each of the three component scores may be raw scores or percentages and represent different metrics derived from enterprise data, as discussed more fully below.

In the present example embodiment, the various social network capsules 142-146 may be selectively flipped to show different information (such as via infographics) pertaining to different components of the corresponding scores, as discussed more fully below.

A first social connection score capsule 142 illustrates enterprise data pertaining to a social network connection score (also called social connection score) of Cory M. Seaver. A social connection score provides an indication of how many people a given human resource might influence or collaborate with. A social connection score may include one or more components. Exact components that are included in a social connection score are implementation specific and may vary depending upon the implementation, without departing from the scope of the present teachings.

In the present example embodiment, the social connection score includes a network connections component, which may be calculated by totaling the number of social network connections an individual has in their social network. For the purposes of the present discussion, social network connections may include content followers, e.g., persons that may not necessarily be registered as part of a human resource's social network but nevertheless are indicated as followers of content created by the human resource.

Examples of additional components, which may be included in a social connection score, or that may replace the social network connections component, include counts of a number of social network followers a person has in their social network; a number of social network spaces to which a person belongs, and so on.

The first social connections score capsule 142 includes a social connection score graph 148, which includes a first social connection score plot 152, which represents historical connection score data pertaining to Cory M. Seaver's enterprise social network. The social connection score graph 148 further includes a second social connection score plot 150, which corresponds to average social connection scores for members of the team selected via the team comparison option 132.

The first social connections score capsule 142 further includes a social connection score percentage change section 156. The percentage change section 156 provides a numerical value corresponding to a percentage change in the social connection score of Cory M. Seaver during the time interval specified via the time slider bar control 60.

The second example user interface display screen 140 further includes a social conversation score capsule 144, which illustrates enterprise data pertaining to social conversation scores of Cory M. Seaver. A social conversation score may indicate how a human resource interacts with others within a social network. The social conversation score may incorporate values pertaining to replies to discussions and/or forum postings, comments in conversations, and so on. In certain implementations, a social conversation score is increased by a predetermined factor that reflects a number of "likes" or comments pertaining to content associated with the social conversation score. Exact metrics used as components of a social conversation score and other score calculation details are implementation specific and may vary, without departing from the scope of the present teachings.

In the present example embodiment, the social conversation score includes a discussion response rate component. The discussion response rate component may be calculated, for example, by averaging percentages of times that Cory M. Seaver responds to content created by members of his enterprise social network, such as by providing responsive content, within the time interval specified by the time slider bar 60.

Examples of additional components that may be included in a social conversation score include counts of instances that Cory M. Seaver replies to discussion or forum postings; counts of instances that members of Cory M. Seaver's social network reply to discussion or forum postings by Cory M. Seaver; numbers of comments that Cory M. Seaver provides via the social network; numbers of comments that members of Cory M. Seaver's social network generate in response to content posted via the social network by Cory M. Seaver, and so on.

The social conversation score capsule 144 is constructed similarly to the first social connections score capsule 142, but illustrates social conversation score data instead of social connection score data. Accordingly, the social conversation score capsule 144 includes a discussion response rate graph 160 and a response rate percentage change section 168. Note that the discussion response rate graph 160 also includes a first social conversation score plot 164 and a second conversation score plot 162, which are analogous to the plots 152, 150 of the social network connections capsule 142, respectively.

The third example user interface display screen 140 further includes a social content score capsule 146. The social content capsule 146 conveys enterprise data pertaining to social network content scores (also called social content scores) of Cory M. Seaver. A social content score may include various types of data, such as a number of bookmarks shared, a number of tags added to particular areas of interest, a number of tags added to certain areas of expertise, and so on. The social network content score may be increased by a predetermined amount if the associated human resource has completed certain sections of a social network page or has completed other types of content, such as an "About Me" section of a social network page.

The social content score may represent a raw numerical score or a percentile rank, which may indicate a particular human resource's numerical content score as a percentage of the highest numerical content score of an enterprise social network or portion thereof.

In general, the social content score provides an indication of how much content an individual (e.g., human resource) has contributed to the enterprise. The social content score may further incorporate data or measurements pertaining to wikis created and/or updated within a predetermined period; creation of blogs created and/or updated within a particular time interval; documents created and/or updated within a particular time interval, and so on.

Furthermore, in certain implementations, a social content score may be increased by a predetermined amount in accordance with how many people have viewed content created by the human resource. Additional factors may account for certain ratings of persons reading the human resource's content, such that higher rated readers result in a higher social content score for the human resource. Furthermore, a social content score may be further increased by a factor based on numbers of comments resulting from the social network content produced by the human resource.

The social content capsule 146 is constructed similarly to the first social connections score capsule 142, but illustrates social content score data instead of social connection score data. Accordingly, the social content capsule 146 includes a social content score graph 161 and a social content score percentage change section 169. Note that the social content score graph 161 also includes a first social content score plot 165 and a second social content score plot 163, which are analogous to the plots 152, 150 of the social network connections capsule 142, respectively.

Note that while the social content capsule 146 currently conveys data via graphs, such data may be depicted via numerical values, bar charts, or other infographics, without departing from the scope of the present teachings. For example, user options for rotating the various capsules 142-144, including the social content capsule 146, may be provided for rotating the capsules 142-146 to reveal additional or different information via infographics and/or numerical data listings.

A social participation score may be presented as a raw score or percentile rank, and may represent a type of overall social network score. The social participation score may combine scores from the three component scores: social connection score, social content score, social conversation score. In the present example embodiment, when one or more capsules i.e., the social connections score capsule 142, social conversation score capsule 144, and/or the social content score capsule 146, pertaining to one or more of the three components are presented via a user interface display screen (e.g., the screens 140, 190, 210 of FIGS. 4-5), then an overall social score, i.e., the social participation score 220 is illustrated in the display screen. Note that other methods or mechanisms for illustrating or enabling access to the social participation score may be provided without departing from the scope of the present teachings.

Each component of the overall social participation score may be selectively weighted when the components are combined or averaged to yield the overall social participation score. However, by default, social network component scores from various social network categories are weighted evenly. For example, the social participation score may be an average of a social connection score, social content score, and social conversation score. When calculating a weighted social participation score, each component score is multiplied by a weight and then summed and then optionally divided by a factor incorporating the number of components involved in the calculation of the weighted social participation score.

During implementation, conversion of a raw score, such as a raw social connection, conversation, or content score, to a percentile rank involves scaling the raw scores to a range between 0 and 100, e.g., by dividing the raw score by a corresponding maximum raw score for a comparison group. Example comparison groups include an entire enterprise, department, enterprise job category, and so on. Exact choices for comparison groups may be implementation specific and may vary, without departing from the scope of the present teachings.

For example if a comparison group has 10 people, and the human resource has a social connection raw score of 281, the individual human resource will have a percentile rank of 100 if 281 is the highest raw score in the human resource's comparison group. If 281 is the lowest raw score in the human resource's comparison group, their percentile rank would be zero. Hence, a percentile rank score will vary according the results of others in an applicable comparison group.

Exact details for calculating a percentile rank may be implementation specific and may vary, without departing from the scope of the present teachings. For example, in an alternative calculation, calculation of a percentile rank (P) for a given raw score (S) that belongs to a comparison group of size N may be computed in accordance with the following equation:

$$P=[(B+0.5E)/N]*100, \qquad [1]$$

where B represents a number of scores in comparison group that are less than S. E represents a number of scores in a comparison group that are equal to S. N represents a total number of scores in the comparison group. P may be rounded to the nearest whole number.

Figure 5:
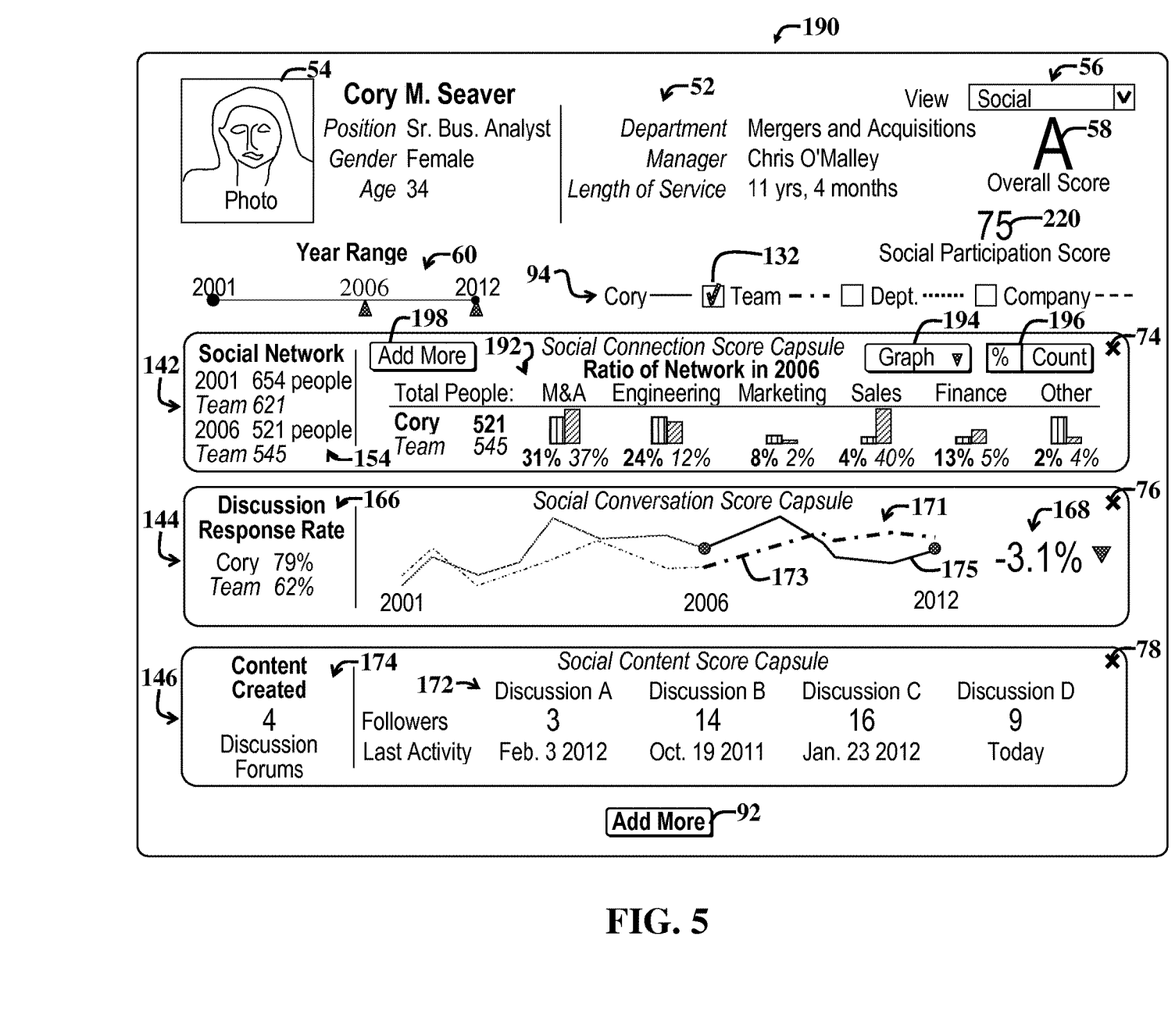
FIG. 5 is a diagram illustrating a fourth example user interface display screen, which illustrate the capsules of FIG. 4 after a first social network capsule has been flipped or rotated.

FIG. 5 is a diagram illustrating a fourth example user interface display screen 190, which illustrate the capsules 142-146 of FIG. 4 after the first social network capsule 142 has been flipped or rotated. The first social connections score capsule 142 of FIG. 4 may be flipped via user selection of a data point of the connections graph 148 thereof. Flipping of the capsule 142 reveals additional social network connections data via an itemized infographic 192. Furthermore, the connections capsule 142 is shown further including a numerical connections section 154, which indicates numerical values corresponding to the numbers of connections in Cory M. Seaver's enterprise social network at beginning and end dates specified via positions of sliders of the time slider bar control 60.

Note that the team comparison option 132 of the check boxes 94 has been selected. Accordingly, the numerical connections section 154 further indicates an average number of enterprise social network connections for each team member at beginning and end dates specified via the time slider bar control 60.

The itemized infographic 192 includes a breakdown of the numbers of Cory M. Seaver's enterprise social network connections by various categories, such as enterprise departments. Examples of enterprise departments include Mergers and Acquisitions, Engineering, Marketing, Sales, Finance, and Other. In the present example embodiment, the relative percentages of numbers of Cory M. Seaver's social network connections for each department are graphically illustrated via bar charts. The percentages of connections are shown for a particular time (e.g., 2006) specified via a first slider of the time slider bar control 60.

Note that since the team comparison option 132 has been selected, that the itemized infographic 192 further illustrates average connection data for members of Cory M. Seaver's team. The team connection data is graphically illustrated in bar charts included in the itemized infographic 192, resulting in a juxtaposition, i.e., graphical comparison between the percentages of enterprise social network connections per department of Cory M. Seaver and those of Cory M. Seaver's team.

The social network connections capsule 142 further includes a back button 198, which may be selected to flip the capsule back to the state shown in FIG. 5. An additional drop down menu 194 enables a user to select how data is displayed via the itemized infographic. Currently, a user has selected a graph option from the drop down menu 194, resulting in display of the bar charts (also called bar graphs) corresponding to the itemized infographic 192. Another possible user option selectable from the drop down menu 194 includes a numerical option, also called a value option, whereby the data shown in the itemized infographic 192 would be presented numerically without use of bar charts or graphs.

The social connections score capsule 142 further includes a user option 196 for adjusting whether data presented via the itemized infographic represents percentage values or numerical values of connections per category, i.e., department. Currently, a user has selected to display values as percentages. For example, currently 31% of Cory M. Seaver's social network connections are in the Mergers and Acquisitions department, whereas on average, 37% of the social network connections of Cory M. Seaver's teammates are in the Mergers and Acquisitions department.

Flipping of the social conversation score capsule 144 of FIG. 4 reveals data pertaining to a discussion response rate component of the social conversation score. Discussion response rate component scores pertaining to Cory M. Seaver and Cory M. Seaver's team are provided in a numerical discussion response rate section 166. The social conversation score capsule 144 of FIG. 5 illustrates a discussion response rate graph 171, which includes plots 173, 175, for Cory M. Seaver and Cory M. Seaver's team, which are analogous to the plots 150, 152 of the social network capsule 142 of FIG. 4.

Flipping of the social content score capsule 146 of FIG. 4 reveals data pertaining to a content-created component of the social content score of Cory M. Seaver. The content-created component includes counts of content created by Cory M. Seaver.

The social content capsule 146 indicates a total number of discussion forums 174 that Cory M. Seaver has participated in within the time interval specified by the time slider bar control 60. The content score capsule further includes an itemization 172 of counts of content created for each forum by Cory M. Seaver within the time interval specified via the time slider bar control 60. Examples of types of content created are wikis, blogs, bookmarks, and so on.

Note that while social network metrics are illustrated in three capsules 142-146 in FIG. 5, additional or fewer types of social metric data may be illustrated or otherwise presented, without departing from the scope of the present teachings. Certain embodiments may include administrator configuration options, allowing an administrator to adjust which metrics and associated enterprise data may be presented via capsules as discussed herein.

For example, various administrator options may enable an administrator to configure one or more social scores by determining which components to include and/or exclude from score calculations; to adjust weights assigned to different score components; to set default calculations or score values; to view score calculation details; and so on.

Data for the social network score may be captured from the social networking module 22 of FIG. 1 or via another module that outputs an activity event stream for social networks of the associated enterprise.

Figure 6:
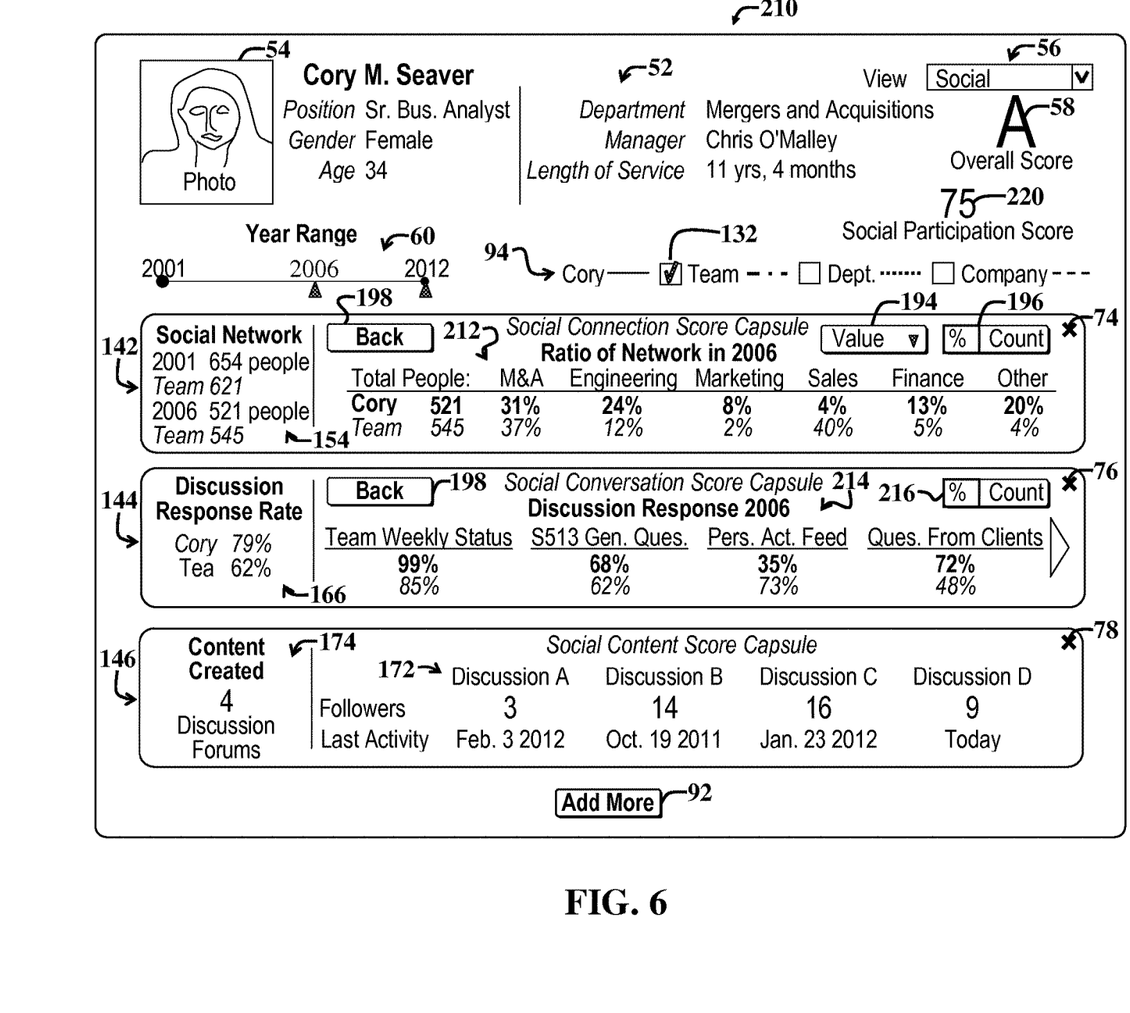
FIG. 6 is a diagram illustrating a fifth example user interface display screen, which illustrate the capsules of FIG. 5 after the first social network capsule has been further adjusted and after a second capsule has been flipped or rotated.

FIG. 6 is a diagram illustrating a fifth example user interface display screen 210, which illustrate the capsules 142-146 of FIG. 5 after the first social network capsule 142 has been further adjusted and after the second capsule 144 has been flipped or rotated.

In FIG. 6, a user has employed the drop down menu 194 of the first social network capsule 142 to trigger a value display 212, which lists numerical values corresponding to the bar charts 192 of FIG. 5.

A user has triggered flipping of the second capsule 144, e.g., by selecting a data point of the response rate graph 171 of FIG. 5, to reveal an itemized discussion response rate section 214. The itemized discussion response rate section 214 illustrates different response rates for various example categories, including a Team Weekly Status category, a General Questions category, a Personal Activity Feed category, and a Questions from Clients category. The provided response rate data in the response rate section 214 includes response rates associated with content generated by Cory M. Seaver, and average response rates generated by Cory M. Seaver's teammates.

The response rate section 214 includes a back user interface control 198 for returning the social conversation score capsule 144 to the previous view, e.g., as shown in FIG. 5. Another user interface control 216 provides user options for determining whether the values displayed in the response rate section 214 represent percentage values (e.g., percentages of total numbers of responses) or actual counts of responses.

Note that while the various example user interface display screens 50, 100, 140, 190, 210 of FIGS. 2-6 are shown with three capsules each, additional or fewer capsules may be shown without departing from the scope of the present teachings. Furthermore, additional, fewer, or different user interface controls for manipulating capsules or performing other operations, than those shown in FIGS. 2-6 may be provided. For example, a user option to refresh score calculations may be provided. Furthermore, various capsules may be combined and represented as additional facets of a single capsule that can be flipped or rotated to reveal additional facets corresponding to the different capsules. For example, in certain implementations, the capsules 142-146 may be combined into a single capsule which can be flipped to reveal the different graphs 148, 160, 161, 171, 172, and so on, without departing from the scope of the present teachings.

Those skilled in the art may readily implement embodiments in accordance with the present teachings without undue experimentation. For example, those skilled in the art will appreciate that to track a social network score or other score over time and to implement comparison operations juxtaposing both historical and current scores, that requisite historical data must be stored, e.g., via a database, and then selectively accessed.

Whenever the scores are recalculated or refreshed, historical data is maintained. In various example embodiments discussed herein, the historical data includes score values and associated dates, times, and organizational information, e.g., department, job, team, and so on. Historical data for computing overall scores is also captured and maintained, e.g., via the talent management database 28 of FIG. 1.

Figure 7:
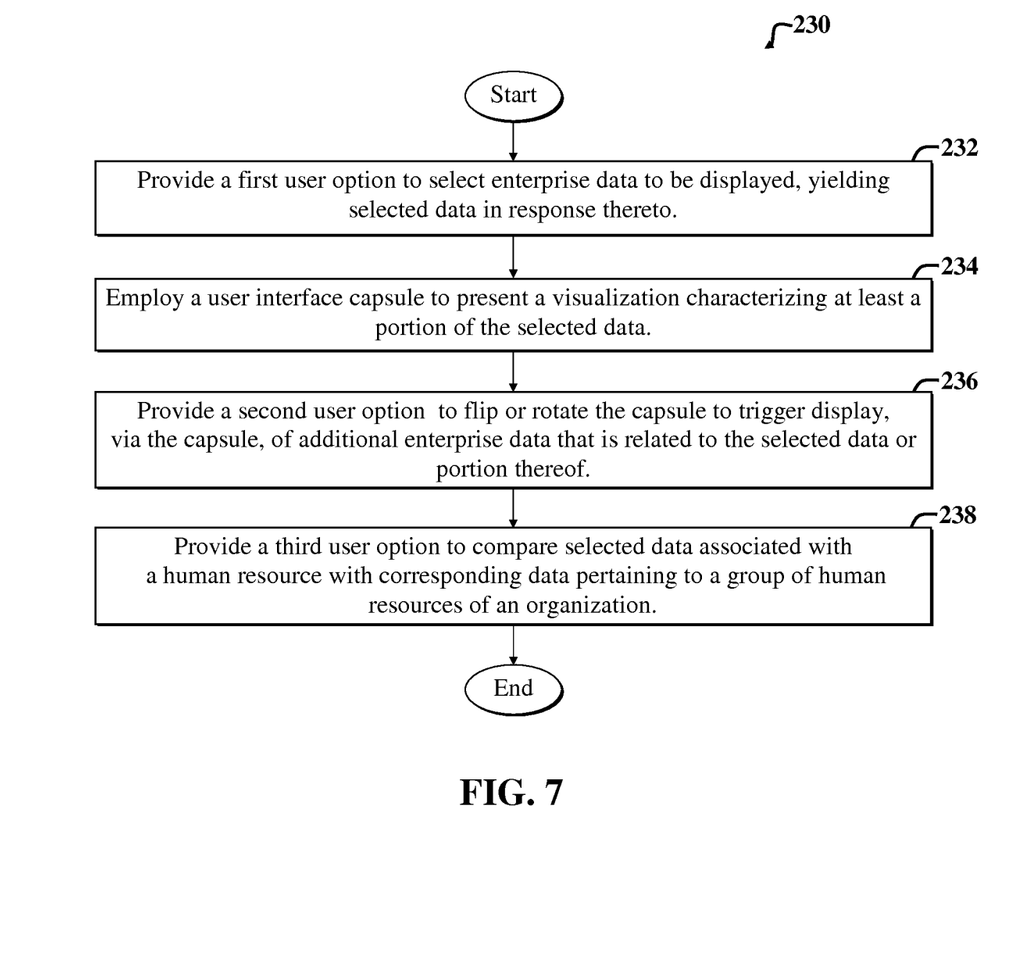
FIG. 7 is a flow diagram of an example method adapted for use with the embodiments of FIGS. 1-6.

FIG. 7 is a flow diagram of an example method 230 adapted for use with the embodiments 10, 50, 100, 140, 190, 210 of FIGS. 1-6. The example method 230 includes a first step 232, which involves providing first user option to select enterprise data to be displayed, yielding selected data in response thereto.

A second step 234 includes employing a user interface capsule to present a visualization or infographic, such as a graph, characterizing at least a portion of the selected data.

A third step 236 includes providing a second user option to flip or rotate the capsule to trigger display, via the capsule, of additional or different enterprise data that is related to the selected data or portion thereof. Alternatively, instead of providing additional or different data, a different visualization may be employed to illustrate the data.

A fourth step 238 includes providing a third user option to compare selected data associated with a human resource (e.g., Cory M. Seaver) with corresponding data pertaining to a group of human resources (e.g., Cory M. Seaver's team) of an enterprise or other organization.

Note that the method 230 may be augmented with additional steps; steps may be rearranged, and certain steps may be omitted, without departing from the scope of the present teachings. For example, an alternative method includes presenting enterprise data pertaining to a human resource via a capsule that includes: a first user option to graphically depict the enterprise data, resulting in an infographic in response thereto; a second user option to compare the enterprise data with other enterprise data associated with one or more groups of the enterprise by simultaneously representing the enterprise data and the other enterprise data via the infographic; and a third user option to selectively adjust the capsule to display one or more numeric representations of data characterizing the infographic.

In the alternative example method, the enterprise data may include one or more social network metrics, such as discussion response rates, social network connections, indications of content created, averages of social metrics pertaining to one or more groups (e.g., team, department, etc.) and so on. For the purposes of the present discussion, a social network metric may be any measurement associated with a social network, such as an enterprise social network. An enterprise social network may be any social network whose members are a part of a particular enterprise.

Note that use of social network metrics, e.g., in association with an employee's profile report, to provide indications of an employee's behavior and/or performance, may yield substantial benefits to an enterprise. For example, HR specialists or managers, may now monitor an employee's participation within an organization to facilitate informed HR decision making. Furthermore, employees, knowing that their participation in the organization is being monitored or rated, may be more likely to increase their participation in enterprise activities, such as projects and accompanying tasks or goals.

Various social network metrics employed via embodiments discussed herein may be broadly categorized as connection, content, or conversation social network metrics. In general, the social network metrics, also called scores, may facilitate illustrating or otherwise indicating an employee's connections with the wider organization and their level of participation and collaboration across the enterprise.

Additional metrics, such as those that represent a percentile rank of each score with reference to averages for the enterprise, i.e. the wider organization may be employed. Such metrics may provide perspective, e.g., meaning and context for individual scores. As discussed above, such percentile rank scores may indicate relative values of a score for a particular individual, e.g., human resource, relative to an average score of individuals of an enterprise or group thereof, e.g., team or department thereof.

The various capsules and accompanying infographics discussed herein are considered interactive, such that they provide user options to drill down, trigger comparison operations, or otherwise change the visualizations. Furthermore, by presenting historical data, such capsules and infographics provide further insight into performance trends of workers, which may further facilitate informed HR decision making.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer or processor-readable storage medium or media for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable media including instructions executable by a processor for selectively presenting a data visualization at least in part in response to a social network score, the non-transitory processor-readable media including instructions for:
   receiving specification of two or more of the following social components: a social connection score, a social content score, and a social conversation score;
   determining a respective value for the specified social components;
   deriving the social network score, at least in part, by using the determined values;
   in response to one or more user input signals, selectively generating the data visualization on a display of a computer system based at least in part on the social network score, wherein the selectively generating of the data visualization further includes generating a graph of data points of the graph associated with the selected social components, wherein each of the data points are user selectable, wherein the graph includes a separate plot of corresponding data points for each of the specified social components; and
   in response to user selection of one of the data points displayed in a particular plot one of the plots associated with the graph, flipping the graph and revealing itemized data for the particular plot within an area displaying the particular plot while also continuing to display other of the plots associated with the graph.

2. The non-transitory processor-readable media of claim 1, wherein the social network score includes a social participation score, the one or more non-transitory processor-readable media further comprising instructions for:
   using a social connection score as a component of the social participation score;
   using a social content score as a component of the social participation score; and
   using a social conversation score as a component of the social participation score.

3. The non-transitory processor-readable media of claim 2, further comprising:
   using a network connections component that includes a number of social network connections that an individual has in their social network.

4. The non-transitory processor-readable media of claim 3, further comprising instructions for:
   using a number of content followers of the individual in the network connections component.

5. The non-transitory processor-readable media of claim 3, further comprising:
   using a number of social network spaces to which the individual belongs.

6. The non-transitory processor-readable media of claim 2, where the social conversation score includes an indication of how a human resource interacts with others within a social network.

7. The non-transitory processor-readable media of claim 6, where the social conversation score includes a measurement of one or more of replies in discussions, forum postings, comments in conversations, a number of likes or comments pertaining to content associated with the social conversation score.

8. The non-transitory processor-readable media of claim 6, where the social conversation score includes a discussion response rate component.

9. The non-transitory processor-readable media of claim 2, where the social content score includes one or more of a number of bookmarks shared, a number of tags added to particular areas of interest, a number of tags added to certain areas of expertise.

10. The non-transitory processor-readable media of claim 2, where the social network score is increased if an associated human resource has completed predetermined sections of a social network page.

11. The non-transitory processor-readable media of claim 1 where the social connection score includes a number of social network connections that an individual has in a social network.

12. The non-transitory processor-readable media of claim 1, where the social content score includes one or more of a number of bookmarks shared.

13. The non-transitory processor-readable media of claim 1, where the social conversation score includes an indication of how a human resource interacts with others within a social network.

14. The non-transitory processor-readable media of claim 1, where a social component includes an indication of a level of collaboration between a particular human resource and another human resource and where the collaboration takes place within a social network.

15. The non-transitory processor-readable media of claim 14, where a social component includes a measurement of content created by the particular human resource within the specified time interval.

16. The non-transitory processor-readable media of claim 14, where a social component includes an indication of a percentage of times that the particular human resource responds to content created by one or more of the other human resources within a specified time interval.

17. The non-transitory processor-readable media of claim 14, where a social component includes an indication of a number of social network connections characterizing a social network of the human resource.

18. A method for selectively presenting a data visualization at least in part in response to a social network score, the method comprising:

receiving specification of two or more of the following social components: a social connection score, a social content score, and a social conversation score;

determining a respective value for the specified social components;

deriving the social network score, at least in part, by using the determined values;

in response to one or more user input signals, selectively generating the data visualization on a display of a computer system based at least in part on the social network score, wherein the selectively generating of the data visualization further includes generating a graph of data points of the graph associated with the selected social components, wherein each of the data points are user selectable, wherein the graph includes a separate plot of corresponding data points for each of the specified social components; and in response to user selection of one of the data points displayed in a particular plot one of the plots associated with the graph, flipping the graph and revealing itemized data for the particular plot within an area displaying the particular plot while also continuing to display other of the plots associated with the graph.

19. A system for selectively presenting a data visualization at least in part in response to a social network score, the system comprising:

one or more processors;

one or more user input devices coupled to the one or more processors;

one or more non-transitory processor-readable media including instructions executable by the one or more processors for selectively presenting a data visualization at least in part in response to a social network score, the one or more non-transitory processor-readable media including instructions for:

receiving specification of two or more of the following social components: a social connection score, a social content score, and a social conversation score;

determining a respective value for the specified social components;

deriving the social network score, at least in part, by using the determined values;

in response to one or more user input signals from the one or more user input devices, selectively generating the data visualization on a display of a computer system based at least in part on the social network score, wherein the selectively generating of the data visualization further includes generating a graph of data points of the graph associated with the selected social components, wherein each of the data points are user selectable, wherein the graph includes a separate plot of corresponding data points for each of the specified social components; and in response to user selection of one of the data points displayed in a particular plot one of the plots associated with the graph, flipping the graph and revealing itemized data for the particular plot within an area displaying the particular plot while also continuing to display other of the plots associated with the graph.

20. The non-transitory processor-readable media of claim 1, wherein the non-transitory processor-readable media including instructions for:

generating a first user interface display screen including a category selection control, a group selection control, a data range control and two or more capsules displaying a category of information selected by the category display control, each capsule having a boundary defining that capsule's region on the display screen;

generating a first infographic displaying a first capsule of the selected category, the first infographic displayed in the first capsule's region including a graphical representation of a first data set of the selected category over a first range selected by the data range control;

generating in the first infographic, in response to selection by the group selection control, a comparison of data from the first data set with data from a second data set related to a group selected by the group selection control;

flipping the first capsule to display within the first capsule's region a replacement infographic that replaces the first infographic to show, in a different format, a comparison of at least a portion of data from the first data set with at least a portion of data from the second data set related to the group selected by the group selection control over at least a portion of the first range selected by the data range control;

generating a second capsule including a second infographic within the second capsule's region, where the second infographic remains the same when the first capsule is flipped, wherein the data range control is a slider bar adapted to specify a time frame associated with the data, wherein the first data set includes one or more indications of salary, wherein the first data set includes one or more talent scores, wherein the first data set includes one or more performance ratings, wherein the first data set includes one or more social network metrics, wherein the one or more social network metrics includes an indication of a level of collaboration between the particular human resource and other human resources in the social network, wherein one or more social network metrics includes a measurement of content created by the human resource within the specified time interval, wherein the one or more social network metrics includes an indication of a percentage of times that the human resource responds to content created by other human resources in the social network of the human resource within the specified time interval, wherein the one or more social network metrics includes an indication of a number of social network connections characterizing the social network of the human resource;

generating in the first infographic, a display showing an overall score associated with the particular human resource; and simultaneously displaying the first and second data sets.

* * * * *